(12) United States Patent  
Kim (10) Patent No.: US 7,663,725 B2  
(45) Date of Patent: Feb. 16, 2010

(54) DRIVING DEVICE AND A LIQUID CRYSTAL DISPLAY INCLUDING THE SAME

(75) Inventor: Hyoung-hak Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 463 days.

(21) Appl. No.: 11/621,731

(22) Filed: Jan. 10, 2007

(65) Prior Publication Data

US 2007/0279568 A1 Dec. 6, 2007

(30) Foreign Application Priority Data

Jun. 5, 2006 (KR) ...................... 10-2006-0050322

(51) Int. Cl.
*G02F 1/1345* (2006.01)
(52) U.S. Cl. ...................... 349/149; 349/151; 361/748; 361/761
(58) Field of Classification Search ......... 349/149–152, 349/138; 361/748, 761, 762
See application file for complete search history.

(56) References Cited

U.S. PATENT DOCUMENTS

2003/0210215 A1* 11/2003 Takahashi .................... 345/87

FOREIGN PATENT DOCUMENTS

| JP | 2005-215185 | 8/2005 |
| KR | 10-2004-0103673 | 12/2004 |
| KR | 10-2005-0068460 | 7/2005 |

* cited by examiner

*Primary Examiner*—Thoi V Duong
(74) *Attorney, Agent, or Firm*—F. Chau & Associates, LLC (57) ABSTRACT

A driving device including a board on which a timing controller for signal processing and a memory are mounted, the board having a conductive field, in which the conductive field has a non-contact region which is coated with an insulating material, and an exposed contact region which is not covered with the insulating material, the exposed contact region formed adjacent to the timing controlling or the memory, a conductive member disposed in the exposed contact region, and a shield covering the board and electrically connected to the conductive field via the conductive member.

27 Claims, 10 Drawing Sheets

DRIVING DEVICE AND A LIQUID CRYSTAL DISPLAY INCLUDING THE SAME

CROSS REFERENCE TO RELATED APPLICATION

This application claims priority to Korean Patent Application No. 10-2006-0050322, filed on Jun. 5, 2006, in the Korean Intellectual Property Office, the disclosure of which is incorporated by reference herein in its entirety.

BACKGROUND OF THE INVENTION

1. Technical Field

The present invention relates to a driving device, and more particularly to a driving device capable of reducing electromagnetic interference (EMI) and a liquid crystal display including the same.

2. Discussion of the Related Art

A liquid crystal display is one of the most widely used flat panel displays. For example, a liquid crystal display is commonly found in a variety of electronic devices such as flat screen televisions, laptop computers, cell phones and digital cameras.

A liquid crystal display may include two display panels provided with field generating electrodes such as pixel electrodes and a common electrode and a liquid crystal layer interposed therebetween. The liquid crystal display displays images by applying voltages to the field generating electrodes to generate an electric field in the liquid crystal layer, which determines orientations of liquid crystal molecules in the liquid crystal layer to adjust polarization of incident light.

A liquid crystal display further includes a driving circuit for driving the display panels. Generally, the driving circuit includes a timing controller, memory and other circuit devices for processing signals for image display. The timing controller, memory and other circuit devices are generally mounted on a printed circuit board.

When signals travel from and to the timing controller, memory and other circuit devices through signal lines on the printed circuit board, electromagnetic waves are generated around the signal lines carrying the signals. The electromagnetic waves induce interfering signals (e.g., noise) in signal lines adjacent to the signal carrying lines, thereby causing electromagnetic interference (referred to as "EMI"). The EMI may cause a malfunction in devices on the printed circuit board or external electronic devices and, in some cases, it may adversely affect human bodies.

Therefore, a need exists for a driving device capable of reducing EMI by suppressing electromagnetic waves emitted from a printed circuit board.

SUMMARY OF THE INVENTION

According to an exemplary embodiment of the present invention, there is provided a driving device including a board on which a timing controller for signal processing and memory are mounted, the board including a conductive field, wherein the conductive field includes a non-contact region which is coated with an insulating material, and an exposed contact region which is not covered with the insulating material, the exposed contact region formed adjacent to the timing controller or the memory, a conductive member disposed in the exposed contact region, and a shield covering the board and electrically connected to the conductive field via the conductive member.

According to an exemplary embodiment of the present invention, there is provided a driving device including a board on which a timing controller for signal processing, and a memory are mounted, the board including a conductive field, wherein the conductive field includes a non-contact region which is coated with an insulating material, and an exposed contact region which is not covered with the insulating material, the exposed contact region formed adjacent to the timing controller or the memory, and a shield covering the board and including a first projection contacting the exposed contact region.

According to an exemplary embodiment of the present invention, there is provided a liquid crystal display including a driving device including a board on which a timing controller for signal processing and a memory are mounted, the board including a conductive field connected to a ground voltage, wherein the conductive field comprises a non-contact region which is coated with an insulating material, an exposed contact region which is not covered with the insulating material, the exposed contact region formed adjacent to the timing controller or the memory, and a plurality of exposed fastening regions which are not covered with the insulating material and are electrically insulated to each other, each fastening region having a fastening hole, and a shield covering the board, and including a first projection contacting the exposed contact region and a second projection contacting each fastening region, and a liquid crystal panel assembly for receiving an image signal from the driving device and displaying an image.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS

The present invention will now be described more fully with reference to the accompanying drawings, in which exemplary embodiments of the invention are shown.

Figure 1A:
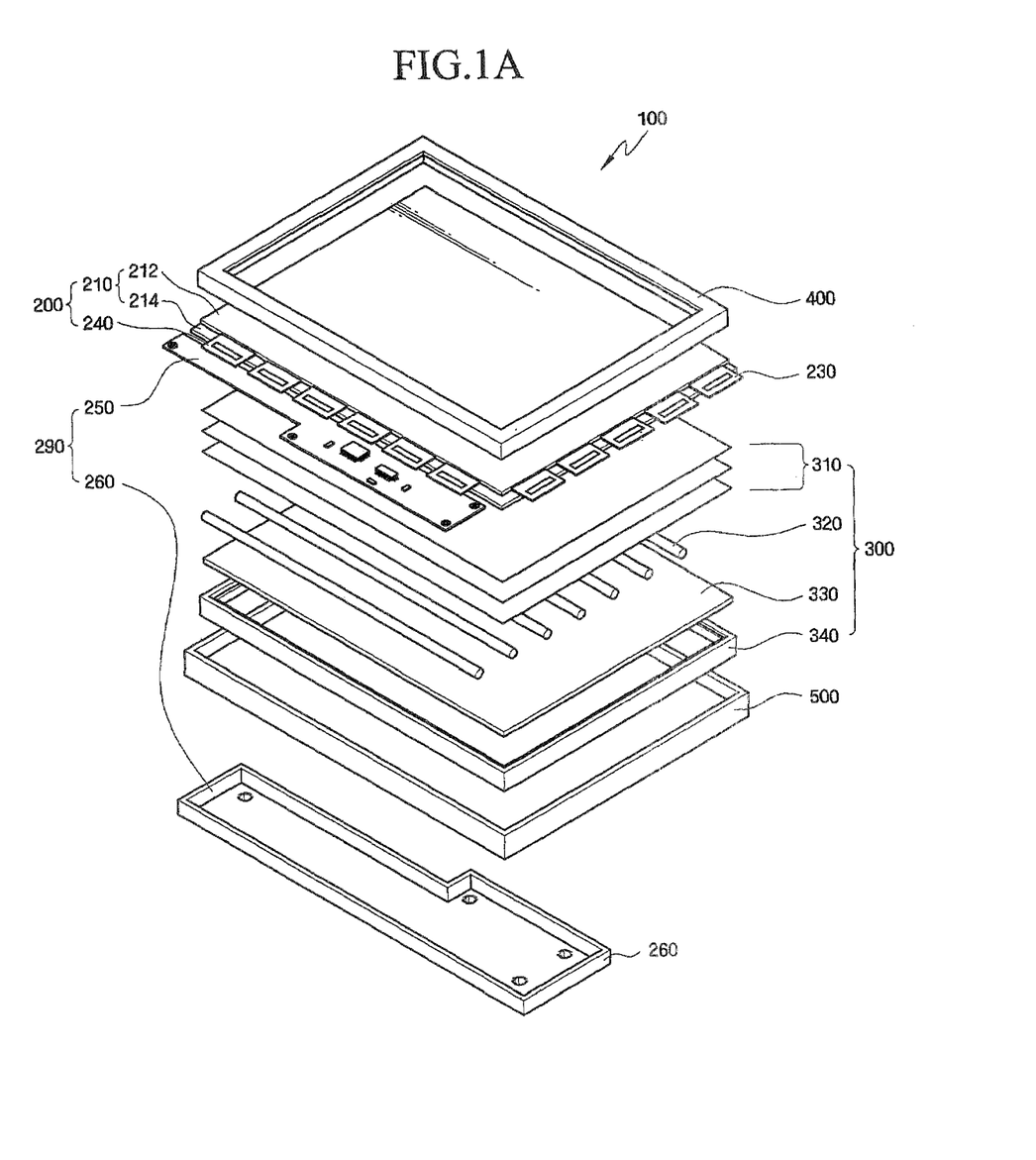
FIGS. 1A and 1B are exploded perspective views illustrating a liquid crystal display according to an exemplary embodiment of the present invention.
Figure 1B:
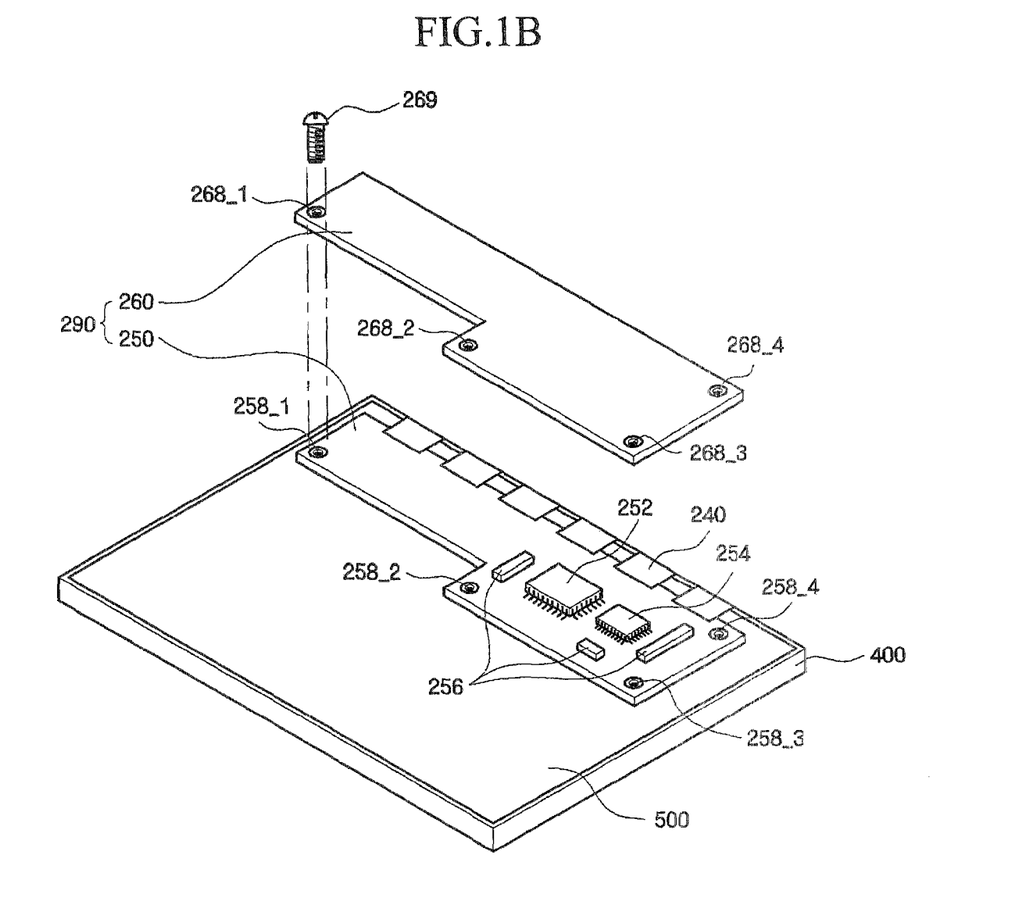

FIGS. 1A and 1B are exploded perspective views illustrating a liquid crystal display 100 according to an exemplary embodiment of the present invention.

Referring to FIG. 1A, the liquid crystal display 100 includes a liquid crystal panel assembly 200, a driving device 290, a backlight assembly 300, an upper housing 400, and a lower housing 500.

The liquid crystal panel assembly 200 includes a liquid crystal panel 210, gate driving semiconductor chip packages 230, and data driving semiconductor chip packages 240. The liquid crystal panel 210 includes a first substrate 212 including a color filter and a common electrode, a second substrate 214 including thin film transistors and pixel electrodes, and a liquid crystal layer (not shown) interposed between the first substrate 212 and the second substrate 214.

The driving device 290 includes a printed circuit board 250 and a shield case 260. A timing controller, a memory, and other circuit elements used as drivers for processing gate driving signals to be supplied to the gate driving semiconductor chip packages 230 and data driving signals to be supplied to the data driving semiconductor chip packages 240 are mounted on the printed circuit board 250.

Referring to FIG. 1B, the printed circuit board 250 is disposed along an outer edge of the lower housing 500, on a rear surface of the lower housing 500, and then secured to the shield case 260 by screws 269.

A conductive member 256 is disposed adjacent to a timing controller 252 and a memory 254 mounted on the printed circuit board 250 and contacts the shield case 260 secured to the printed circuit board 250. Here, a ground voltage of the printed circuit board 250 is applied to the conductive member 256. In this manner, the conductive member 256 serves to shield electromagnetic waves generated by the timing controller 252 and the memory 254, and at the same time, to electrically connect the printed circuit board 250 to ground (e.g., the shield case 260).

Thus, a ground potential is broadly distributed in the periphery of the timing controller 252 and the memory 254 on the printed circuit board 250. A region at ground potential is referred to as a "ground region". The larger the ground region, the more stable the ground potential becomes. Therefore, since the ground region is broadly distributed, the emission of electromagnetic waves from the timing controller 252 and the memory 254 is reduced, thereby reducing the EMI.

The ground voltage of the printed circuit board 250 can also be applied to first fastening regions 258_1, 258_2, 258_3, and 258_4 of the printed circuit board 250. In this case, the ground voltage is also applied to second fastening regions 268_1, 268_2, 268_3, and 268_4 of the shield case 260 since the first fastening regions 258_1, 258_2, 258_3, and 258_4 are connected to the second fastening regions 268_1, 268_2, 268_3, and 268_4 via the screws 269.

Therefore, the area of a ground region is enlarged, and thus, a ground potential becomes stabilized, thereby suppressing the emission of electromagnetic waves, thus reducing the EMI. The printed circuit board 250 and the shield case 260 will be described later with reference to FIGS. 2 and 3.

Referring back to FIG. 1A, the backlight assembly 300 includes optical sheets 310, a lamp unit 320, a reflective plate 330, and a mold frame 340.

The optical sheets 310 are disposed on the lamp unit 320 and serve to diffuse and focus light emitted from the lamp unit 320. The optical sheets 310 include a diffusion sheet, a prism sheet, a protection sheet, or the like.

The lamp unit 320 has a direct-type structure in which a plurality of lamps are arranged in parallel to each other. However, the present invention is not limited thereto, and the lamp unit 320 may also have an edge-type structure. For the latter case, the lamp unit 320 may include a light guide plate (not shown) for dispersing light.

The reflective plate 330 is disposed below the lamp unit 320. The reflective plate 330 reflects light emitted from the lamp unit 320 toward the liquid crystal panel assembly 200. The reflective plate 330 may also be formed integrally with the bottom surface of the lower housing 500.

The mold frame 340 serves to securely support the optical sheets 310, the lamp unit 320, and the reflective plate 330. The upper housing 400 is disposed on the liquid crystal panel assembly 200 and coupled to the lower housing 500.

Figure 2:
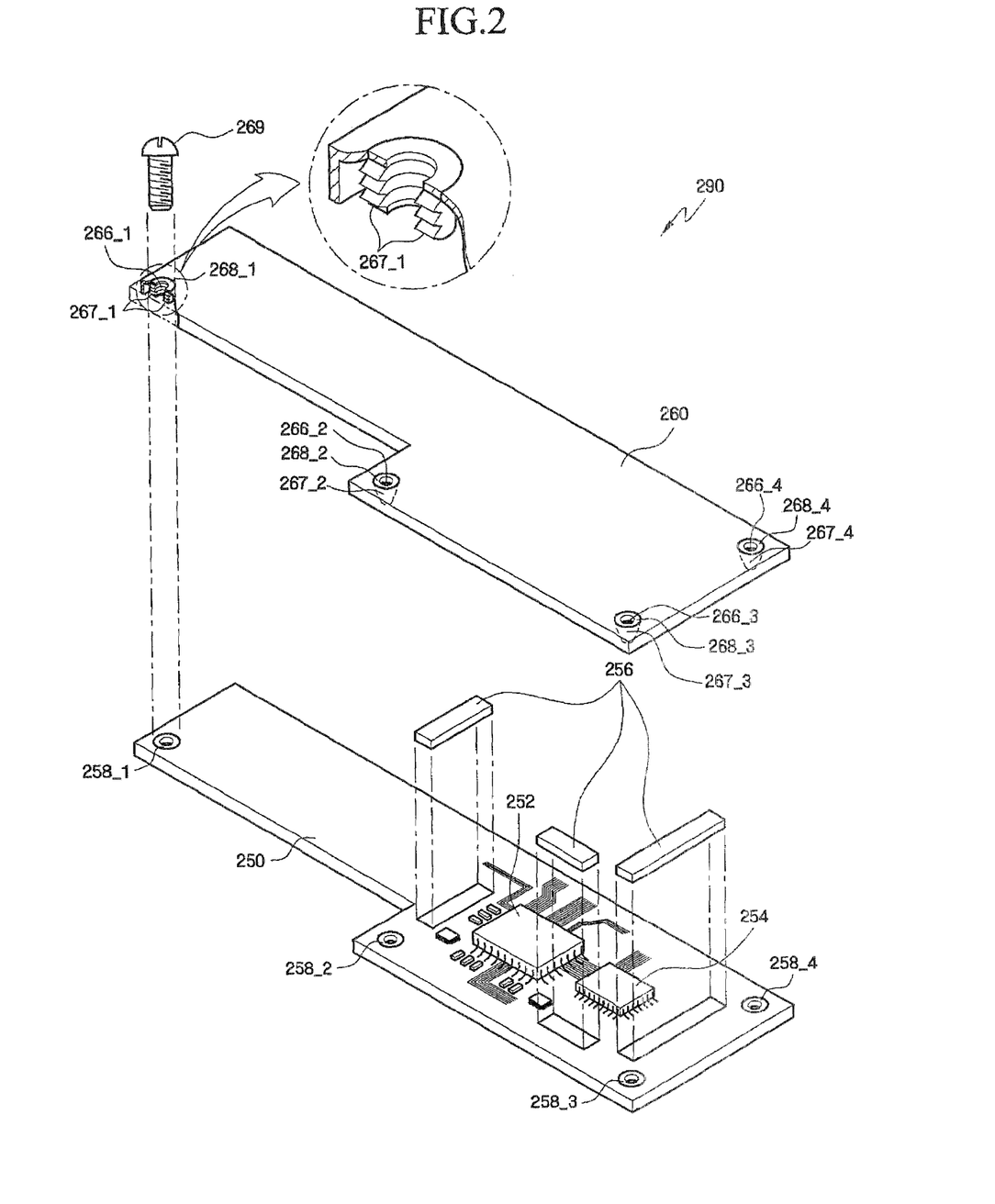
FIG. 2 is an exploded perspective view illustrating a driving device according to an exemplary embodiment of the present invention.
Figure 3:
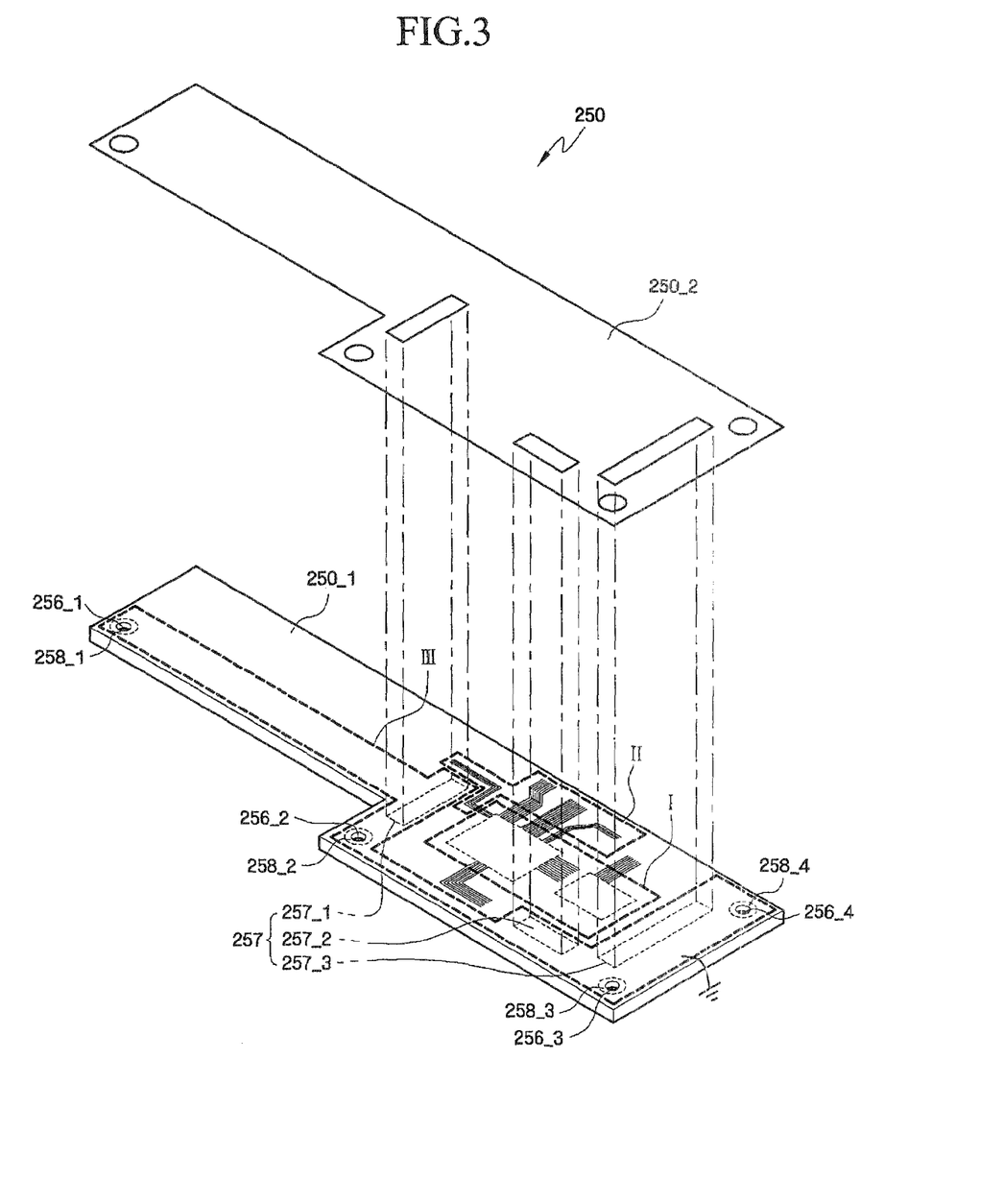
FIG. 3 is a perspective view illustrating a printed circuit board of FIG. 2.

FIG. 2 is an exploded perspective view illustrating a driving device 290 according to an exemplary embodiment of the present invention, and FIG. 3 is a perspective view illustrating a printed circuit board 250 of FIG. 2.

Referring to FIG. 2, the printed circuit board 250 and a shield case 260 are electrically connected to each other via a conductive member 256, first fastening regions 258_1, 258_2, 258_3, and 258_4, and a second fastening regions 268_1, 268_2, 268_3, and 268_4.

The conductive member 256 is disposed adjacent to a timing controller 252 and a memory 254 mounted on the printed circuit board 250. Here, the conductive member 256 may be an elastic gasket coated with a conductive material or an inelastic conductor.

The placement of a conductive member (see 256 of FIG. 2) will not be described in detail with reference to FIG. 3.

Referring to FIG. 3, the printed circuit board 250 is made by coating a base substrate 250_1 with an insulating material 250_2. While FIG. 3 has illustrated that the base substrate 250_1 of the printed circuit board 250 is mono-layered, the base substrate 250_1 may be multi-layered.

The base substrate 250_1 includes a first field I wherein a timing controller (see 252 of FIG. 2), a memory (see 254 of FIG. 2), and other circuit elements are mounted, a second field II including signal lines for electrical connection of the timing controller, the memory, and the other circuit elements and for signal transmission, and a conductive field III.

The conductive field III includes a non-contact region, a contact region 257, and the first fastening regions 258_1, 258_2, 258_3, and 258_4. The conductive field III serves as an electric ground of the printed circuit board 250.

The non-contact region of the conductive field III is a non-exposed region which is coated with the insulating material 250_2. The contact region 257 of the conductive field III is an exposed region which is not covered with the insulating material 250_2. The first fastening regions 258_1, 258_2, 258_3, and 258_4 of the conductive field III are exposed regions which are not covered with the insulating material 250_2, and respectively include first fastening holes 256_1, 256_2, 256_3, and 256_4.

The contact region 257 is formed by partially exposing the conductive field III such that it is adjacent to regions intended for the timing controller and the memory (see 252 and 254, respectively, in FIG. 2) and is not covered with the insulating material 250_2. A conductive member (see 256 of FIG. 2) is disposed in the contact region 257. It is preferred that the contact region 257 is disposed closer to the timing controller and the memory and that it has a larger area than the conductive member.

Referring back to FIG. 2, together with FIG. 3, the conductive member 256 is disposed adjacent to the timing controller 252 and the memory 254, and contacts the shield case 260 secured to the printed circuit board 250. Here, since the ground voltage of the printed circuit board 250 is applied to the conductive field III, it can also be applied to the shield case 260 via the conductive member 256.

In this manner, the conductive member 256 disposed around the timing controller 252 and the memory 254 serves to shield electromagnetic waves emitted from the timing controller 252 and the memory 254, and at the same time, provide the ground voltage of the printed circuit board 250 to the shield case 260 so that the area of a ground region surrounding the timing controller 525 and the memory 254 is enlarged. Therefore, the emission of electromagnetic waves from the timing controller 252 and the memory 254 is reduced, thereby reducing the EMI.

In more detail, the contact region 257 may be spaced less than about 7 cm apart from a side of the timing controller 252 or the memory 254. The conductive member 256 is disposed in the contact region 257. Thus, a ground region is within the about 7 cm region from a side of the timing controller 252 or the memory 254. Therefore, electromagnetic waves emitted from the timing controller 252 and the memory 254 can be more effectively shielded, thereby effectively reducing the EMI. Meanwhile, the contact region 257 cannot be in a marginal region for the installation of the timing controller 252 or the memory 254 on the printed circuit board 250. For example, in a case where wire bonding is performed in the periphery of the timing controller 252 or the memory 254 and the periphery for wire bonding is within about a 0.3 cm region from a side of the timing controller 252 or the memory 254, the contact region 257 may be spaced about 0.3 to about 7 cm apart from a side of the timing controller 252 or the memory 254. Here, the about 0.3 cm is the lower limit of a spacing of the contact region 257 from a side of the timing controller 252 or the memory 254. The lower limit of the spacing of the contact region 257 from a side of the timing controller 252 or the memory 254 can be changed according to a bonding form or a bonding technique.

The second fastening regions 268_1, 268_2, 268_3, and 268_4 are formed in the shield case 260 to correspond to the first fastening regions 258_1, 258_2, 258_3, and 258_4. Projections 267_1, 267_2, 267_3, 267_4 are respectively formed in the second fastening regions 268_1, 268_2, 268_3, and 268_4 to contact the second fastening regions 268_1, 268_2, 268_3, and 268_4 to the first fastening regions 258_1, 258_2, 258_3, and 258_4. Second fastening holes 266_1, 266_2, 266_3, 266_4 are respectively formed in the projections 267_1, 267_2, 267_3, 267_4 to correspond in the first fastening holes 256_1, 256_2, 256_3, and 256_4. Thus, the first fastening holes 256_1, 256_2, 256_3, and 256_4 are connected to the second fastening holes 266_1, 266_2, 266_3, 266_4 through the screws 269.

The ground voltage of the printed circuit board 250 can be applied to the first fastening regions 258_1, 258_2, 258_3, and 258_4. Thus, the ground voltage of the printed circuit board 250 is applied to the shield case 260 electrically connected through the projections 267_1, 267_2, 267_3, 267_4 contacting the first fastening regions 258_1, 258_2, 258_3, and 258_4. In this manner, the area of a ground region is enlarged through the connection between the first fastening regions 258_1, 258_2, 258_3, and 258_4 and the second fastening regions 268_1, 268_2, 268_3, and 268_4. Therefore, the emission of electromagnetic waves from the printed circuit board 250 is prevented, thereby reducing the EMI. An electrical connection between the printed circuit board 250 and the shield case 260 is not limited to the above-illustrated example, and the shapes of the projections 267_1, 267_2, 267_3, 267_4 can also be changed.

Figure 4:
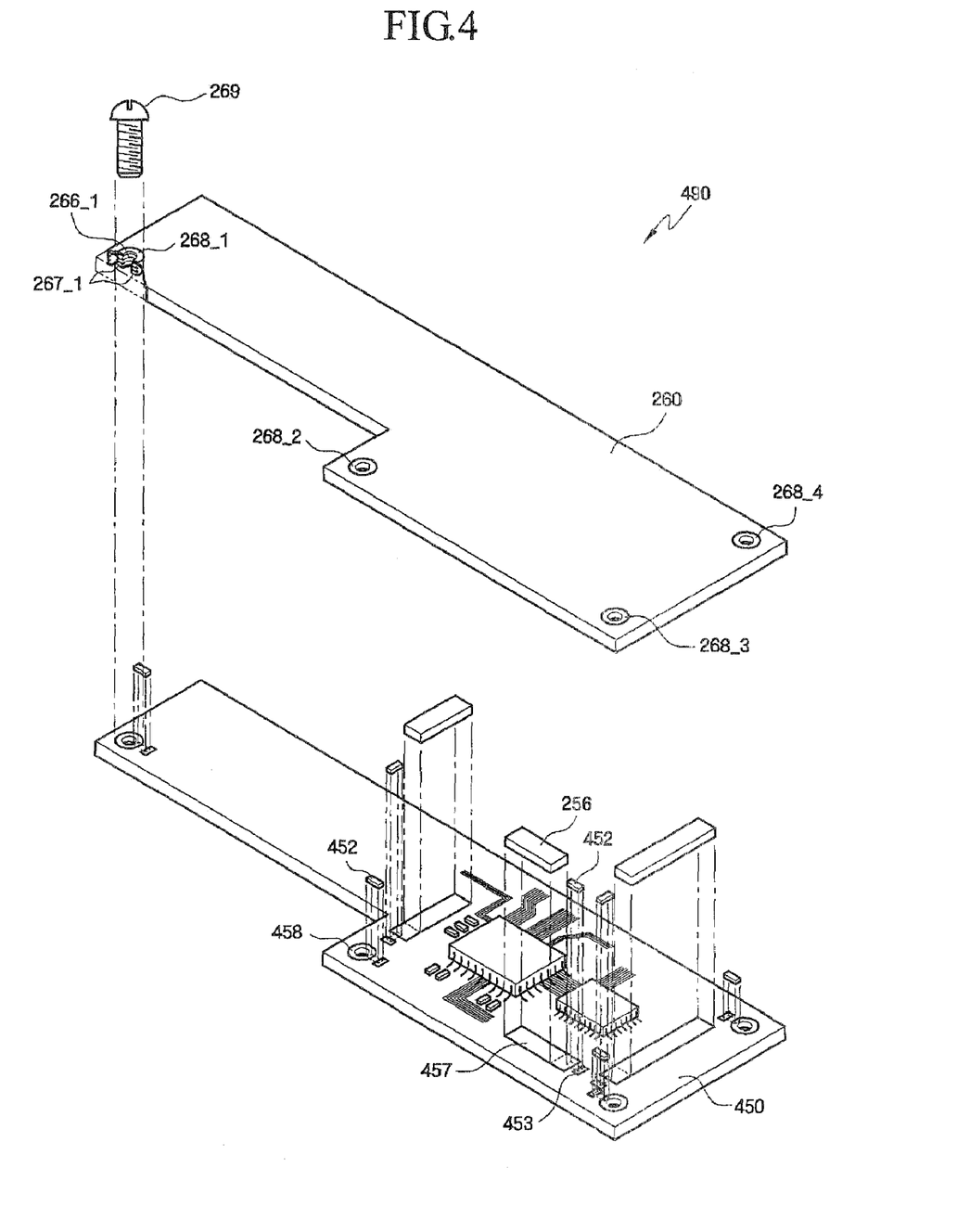
FIG. 4 is an exploded perspective view illustrating a driving device according to an exemplary embodiment of the present invention.
Figure 5:
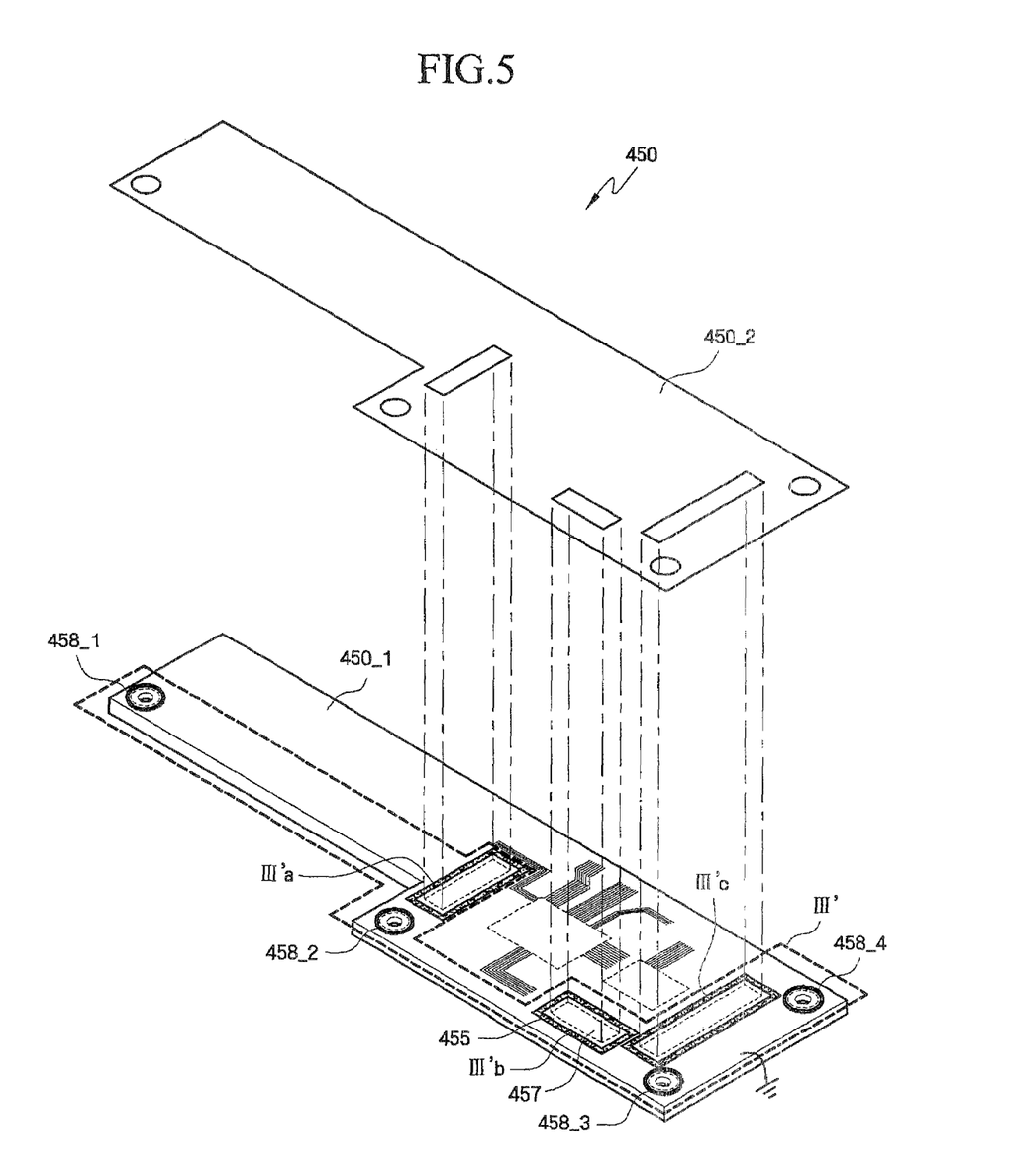
FIG. 5 is a perspective view illustrating a printed circuit board of FIG. 4.

FIG. 4 is an exploded perspective view illustrating a driving device 490 according to an exemplary embodiment of the present invention, and FIG. 5 is a perspective view illustrating a printed circuit board 450 of FIG. 4. For brevity, components having substantially the same function as those shown in FIG. 2 are respectively identified by the same reference numerals, and a detailed description thereof will be omitted.

Referring to FIG. 4, a conductive member 256 and a plurality of connectors 452 are mounted on the printed circuit board 450. In the driving device 490, a ground voltage is selectively applied to a shield case 260 by means of the plurality of connectors 452, unlike the driving device 290.

The conductive member 256 electrically connects the shield case 260 and a contact region 457, and each of the connectors 452 selectively connects the contact region 457 and a first fastening region 458 to a ground voltage of the printed circuit board 450.

Hereinafter, a method of selectively connecting the contact region 457 and the first fastening region 458 to a ground voltage of the printed circuit board 450 using the connector 452 will be described with reference to FIG. 5.

Referring to FIG. 4, a base substrate 450_1 includes a conductive field III' where a ground voltage is applied. The conductive field III' includes a plurality of conductive sub-fields III'a, III'b, and III'c, and a plurality of first fastening regions 458_1, 458_2, 458_3, and 458_4.

The conductive sub-fields III'a, III'b, and III'c, and the first fastening regions 458_1, 458_2, 458_3, and 458_4 are electrically insulated. Each of the conductive sub-fields III'a, III'b, and III'c includes a non-contact region 455 which is coated with an insulating material 450_2 and is not exposed to the outside, and a contact region 457 which is not covered by the insulating material 450_2 and is exposed to the outside.

As shown in FIG. 5, although a ground voltage is applied to the conductive field III', the ground voltage is not applied to the conductive sub-fields III'a, III'b, and III'c, and the first fastening regions 458_1, 458_2, 458_3, and 458_4 since the conductive sub-fields III'a, III'b, and III'c, and the first fastening regions 458_1, 458_2, 458_3, and 458_4 are electrically insulated.

Referring to FIG. 4 and FIG. 4, some regions 453 of the conductive field III' are not covered with the insulating material 450_2, and thus, are exposed to the outside. In a case where the connector 452 is installed so that the contact region 457 is electrically connected to one of the regions 453, the ground voltage of the printed circuit board 450 is applied to the contact region 457 via the connector 452. However, in the absence of the connector 452, the ground voltage is not applied to the contact region 457.

In this manner, the contact region 457 is selectively connected to the ground voltage by means of the connector 452, and thus, the shield case 260 contacting the conductive member 256 is selectively connected to the ground voltage.

The first fastening region 458 is also electrically connected to the conductive field III' having a ground potential via the connector 452. In the absence of the connector 452, the ground voltage is not applied to the first fastening region 458. In this manner, the ground voltage is selectively connected to the first fastening region 458 by means of the connector 452, and thus, the shield case 260 contacting the first fastening region 458 is selectively connected to the ground voltage.

The connector 452 may be a resistance of 0 kΩ or several kΩ or less (e.g., 10 Ω) or a conductive bead. In the current embodiment of the present invention, although selective connection of the ground voltage to the contact region 457 or the first fastening region 458 to the conductive field III' using the connector 452 has been illustrated, the present invention is not limited thereto. The ground voltage may also be selectively connected to the contact region 457 or the first fastening region 458 using a switching device such as p-MOS or n-MOS transistor.

As described above with reference to FIGS. 4 and 5, in a case where the emission of electromagnetic waves is not reduced in spite of increasing the area of a ground region, a driving device can be configured such that a ground voltage is selectively applied to a contact region or a first fastening region. In this manner, the emission of electromagnetic waves can be minimized by selectively connecting a shield case to the ground voltage of a printed circuit board.

Figure 6:
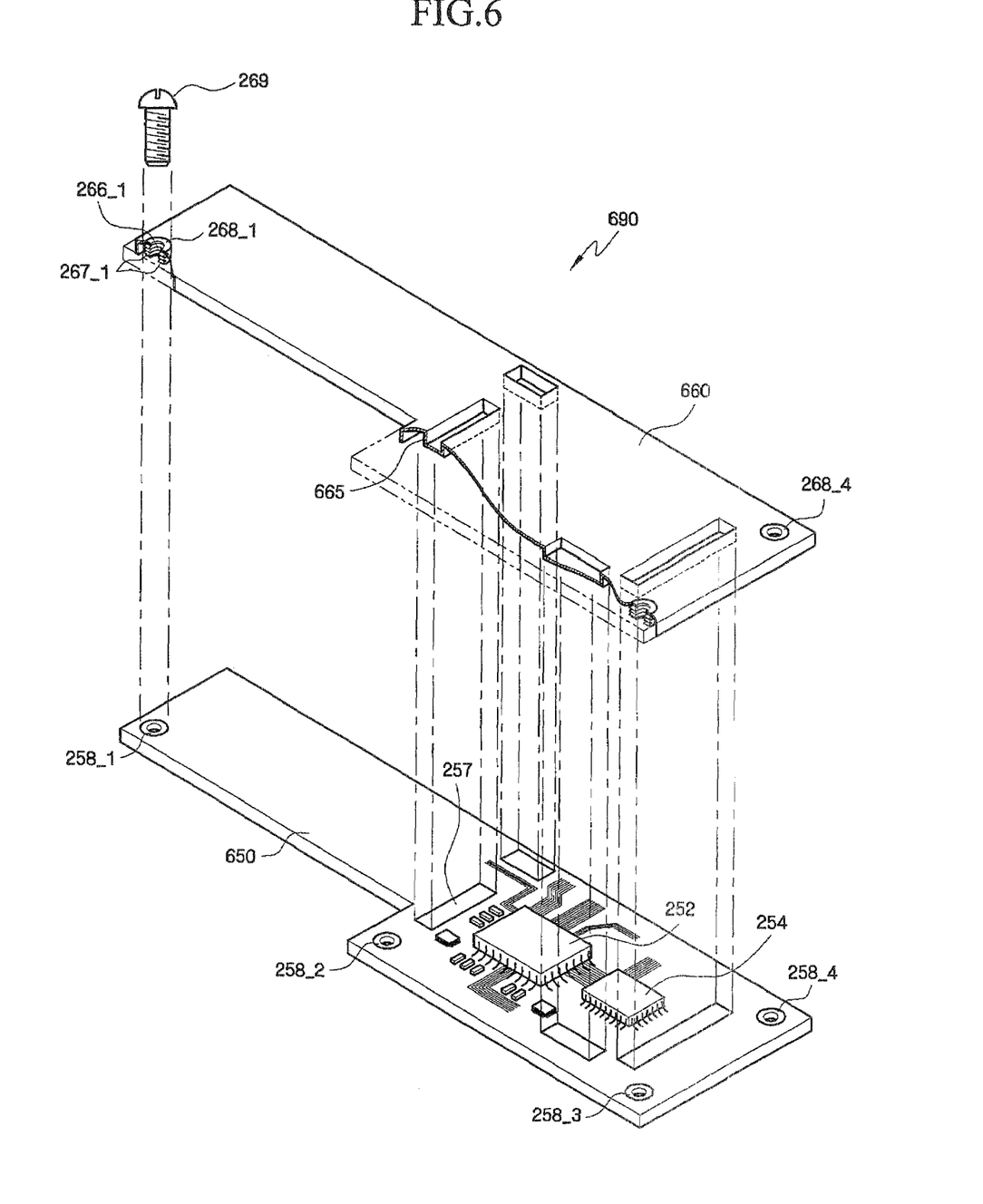
FIG. 6 is an exploded perspective view illustrating a driving device according to an exemplary embodiment of the present invention.

FIG. 6 is an exploded perspective view illustrating a driving device 690 according to an exemplary embodiment of the present invention. For brevity, components having substantially the same function as those shown in FIGS. 2 and 3 are respectively identified by the same reference numerals, and a detailed description thereof will be omitted.

Referring to FIG. 6, a printed circuit board 650 is electrically connected to a shield case 660 via a first projection 665 formed in the shield case 660. Unlike the driving devices 290 and 490, in the driving device 690, the ground voltage of the printed circuit board 650 is connected to the shield case 660 via the first projection 665 instead of using a conductive member.

The first projection 665 is formed to correspond to a contact region 257 which is adjacent to a timing controller 252 or a memory 254. Thus, when the shield case 660 is secured to the printed circuit board 650, it contacts the contact region 257. The contact region 257 is formed in the same manner as described above with reference to FIG. 3.

Since the ground voltage of the printed circuit board 650 is connected to a conductive field (see III of FIG. 3), it is electrically applied to the shield case 660 via the first projection 665.

In this manner, the first projection 665 contacting the contact region 257 around the timing controller 252 or the memory 254 shields electromagnetic waves emitted from the timing controller 252 and the memory 254. Furthermore, since the ground voltage of the printed circuit board 650 is applied to the shield case 660, the area of a ground region surrounding the timing controller 252 and the memory 254 is enlarged, thereby reducing the emission of electromagnetic waves, thus reducing the EMI.

The shape of the first projection 665 can be changed according to the shape of the contact region 257. The first projection 665 may be structured such that a contact area between the first projection 665 and the contact region 257 is maximized. By doing so, the ground voltage applied to the shield case 660 can be more stably maintained.

In more detail, the contact region 257 may be spaced less than about 7 cm apart from a side of the timing controller 252 or the memory 254. The first projection 665 touches the contact region 257. Thus, a ground region is within the about 7 cm region from a side of the timing controller 252 or the memory 254. Therefore, the emission of electromagnetic waves from the timing controller 252 and the memory 254 can be more effectively shielded, thereby effectively reducing the EMI. Meanwhile, the contact region 257 cannot be in a marginal region for the installation of the timing controller 252 or the memory 254 on the printed circuit board 250. For example, in a case where wire bonding is performed in the periphery of the timing controller 252 or the memory 254 and the periphery for wire bonding is within about a 0.3 cm region from a side of the timing controller 252 or the memory 254, the contact region 257 may be spaced about 0.3 to about 7 cm apart from a side of the timing controller 252 or the memory 254. Here, the about 0.3 cm is the lower limit of a spacing of the contact region 257 from a side of the timing controller 252 or the memory 254. The lower limit of the spacing of the contact region 257 from a side of the timing controller 252 or the memory 254 can be changed according to a bonding form or a bonding technique.

Second projections 267_1 (267_2, 267_3, 267_4 (not shown)) formed in the shield case 660 contact first fastening regions 258_1, 258_2, 258_3, and 258_4 of the printed circuit board 650, respectively. When the ground voltage is applied to the first fastening regions 258_1, 258_2, 258_3, and 258_4, it is applied to the shield case 660 via the second projections 267_1, 267_2, 267_3, 267_4 contacting the first fastening regions 258_1, 258_2, 258_3, and 258_4, thereby enlarging the area of a ground region.

Figure 7:
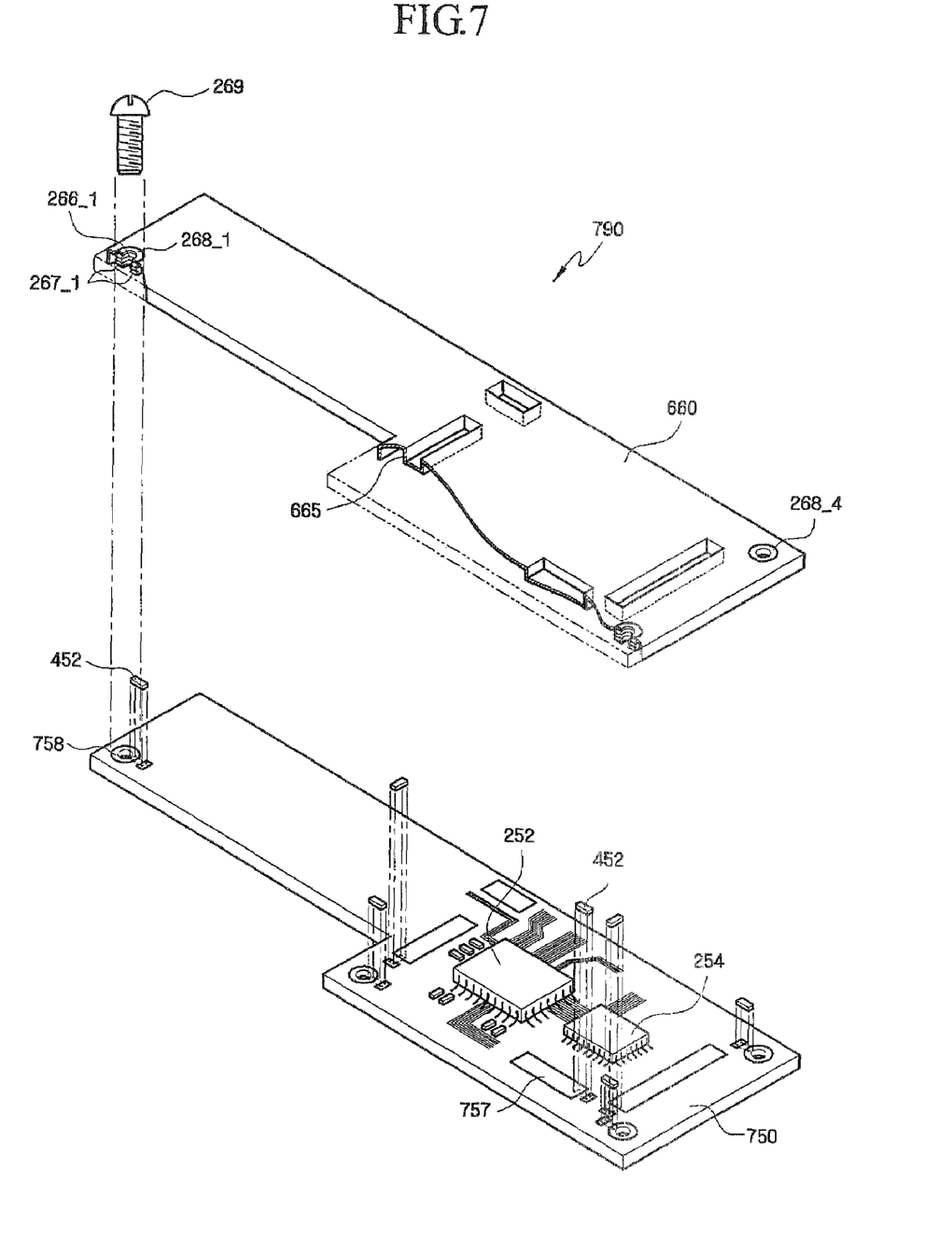
FIG. 7 is an exploded perspective view illustrating a driving device according to an exemplary embodiment of the present invention.

FIG. 7 is an exploded perspective view illustrating a driving device 790 according to an exemplary embodiment of the present invention. For brevity, components having substantially the same function as those shown in FIGS. 4 and 6 are respectively identified by the same reference numerals, and a detailed description thereof will be omitted.

Referring to FIG. 7, the driving device 790 includes a connector 452 for selectively connecting a ground voltage to a shield case 660, unlike the driving device 690.

Here, a contact region 757 and a first fastening region 758 are formed in the same manner as described above with reference to FIG. 5. In the absence of the connector 452, the ground voltage is not applied to the contact region 757 and the first fastening region 758. Thus, even when the shield case 660 is secured to a printed circuit board 750, the ground voltage is not applied to the shield case 660.

According to the driving device 790 of the current embodiment of the present invention, the emission of electromagnetic waves from a timing controller 252 and a memory 254 can be effectively minimized by installing the connector 452 when needed, thereby reducing the EMI.

Meanwhile, the driving device 790 may also be structured such that only the first fastening region 758 is selectively connected to the ground voltage, and the contact region 757 contacting a first projection 665 is always connected to the ground voltage. In this case, a ground region is always formed around the timing controller 252 and the memory 254, whereas it is selectively formed around the first fastening region 758.

Figure 8:
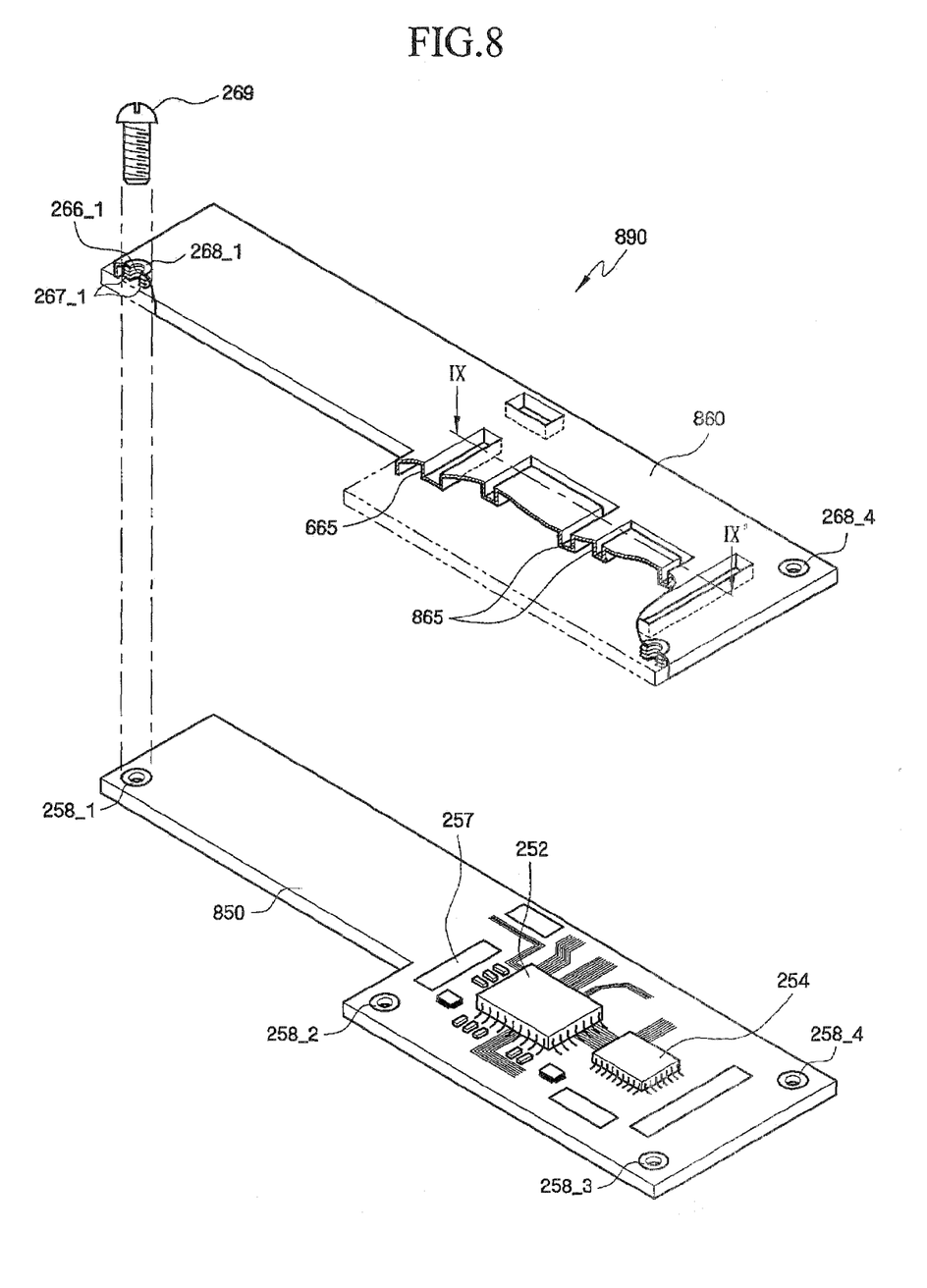
FIG. 8 is an exploded perspective view illustrating a driving device according to an exemplary embodiment of the present invention.
Figure 9:
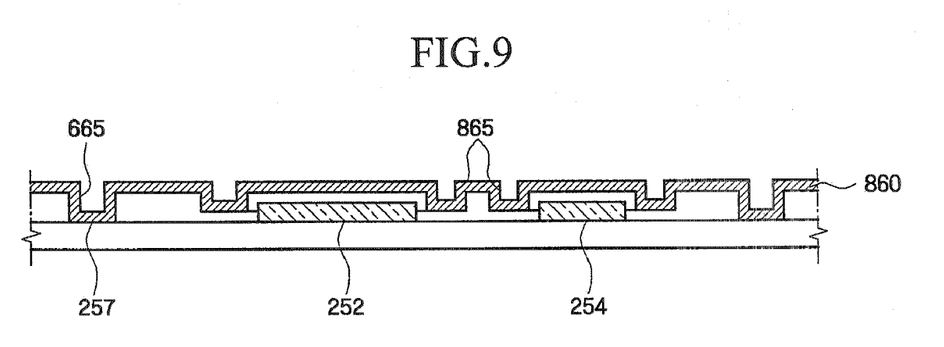
FIG. 9 is a sectional view taken along a line IX-IX' of FIG. 8.

FIG. 8 is an exploded perspective view illustrating a driving device 890 according to an exemplary embodiment of the present invention, and FIG. 9 is a sectional view taken along a line IX-IX' of FIG. 8. For brevity, components having substantially the same function as those shown in FIG. 6 are respectively identified by the same reference numerals, and a detailed description thereof will be omitted.

Referring to FIGS. 8 and 9, a shield case 860 of the driving device 890 further includes a third projection 865 corresponding to a timing controller 252 and a memory 254 mounted on a printed circuit board 850, unlike the driving devices 290, 490, 690 and 790.

As shown in FIGS. 8 and 9, when the shield case 860 is secured to the printed circuit board 850, the third projection 865 surrounds the timing controller 252 and the memory 254. At this time, the third projection 865 is not contacting the printed circuit board 850.

The shield case 860 can effectively shield electromagnetic waves emitted from the timing controller 252 and the memory 254, thereby reducing the EMI. Therefore, an adverse effect of the electromagnetic waves on other devices mounted on the printed circuit board 850 can be reduced.

Although the aforementioned embodiments of the present invention have been described with regard to liquid crystal displays (LCDs), the present invention is not limited thereto. The present invention can also be applied to various displays, e.g., Plasma Display Panels (PDPs), Organic Light Emitting Diodes (OLEDs), Printed Circuit Boards (PCBs), Flexible Printed Circuit Boards (FPCBs), and so on.

As described above, a driving device and a liquid crystal display including the same according to an exemplary embodiment of the present invention can suppress electromagnetic radiation emitted from a printed circuit board, thereby reducing the overall EMI of the liquid crystal display.

While the present invention has been particularly shown and described with reference to exemplary embodiments thereof, it will be understood by those of ordinary skill in the art that various changes may be made in the form and details without departing from the spirit and scope of the present invention as defined by the following claims.

What is claimed is:

1. A driving device comprising:
    a board on which a timing controller for signal processing and a memory are mounted, the board comprising a conductive field, wherein the conductive field comprises a non-contact region which is coated with an insulating material and an exposed contact region which is not covered with the insulating material, the exposed contact region formed adjacent to the timing controller or the memory;
    a conductive member disposed in the exposed contact region; and
    a shield covering the board and electrically connected to the conductive field via the conductive member.

2. The driving device of claim 1, wherein the conductive field is connected to a ground voltage.

3. The driving device of claim 1, wherein the conductive field comprises a plurality of conductive sub-fields which are electrically insulated to each other, each conductive sub-field comprising a portion of the exposed contact region.

4. The driving device of claim 3, wherein the exposed contact region is connected to a ground voltage by a connector.

5. The driving device of claim 4, wherein the connector has a resistance of about several kΩ or less.

6. The driving device of claim 1, wherein the conductive field further comprises a plurality of exposed fastening regions which are not covered with the insulating material and are electrically insulated to each other, each fastening region comprising a first fastening hole.

7. The driving device of claim 6, wherein each of the fastening regions is connected to a ground voltage by a connector.

8. The driving device of claim 7, wherein the connector has a resistance of about several kΩ or less.

9. The driving device of claim 6, wherein the shield comprises a plurality of projections which contact the fastening regions, each projection having a second fastening hole corresponding to the first fastening hole, and
    wherein the first and second fastening holes are connected to each other by a screw.

10. The driving device of claim 1, wherein the conductive member is a gasket coated with a conductive material.

11. The driving device of claim 1, wherein the exposed contact region is spaced less than about 7 cm away from a side of the timing controller or the memory.

12. The driving device of claim 1, wherein the exposed contact region is formed adjacent to the timing controller and the memory.

13. A driving device comprising:
    a board on which a timing controller for signal processing and a memory are mounted, the board comprising a conductive field, wherein the conductive field comprises a non-contact region which is coated with an insulating material and an exposed contact region which is not covered with the insulating material, the exposed contact region formed adjacent to the timing controller or the memory; and
    a shield covering the board and comprising a first projection contacting the exposed contact region.

14. The driving device of claim 13, wherein the conductive field is connected to a ground voltage.

15. The driving device of claim 13, wherein the conductive field comprises a plurality of conductive sub-fields which are electrically insulated to each other, each conductive sub-field comprising a portion of the exposed contact region.

16. The driving device of claim 15, wherein the exposed contact region is connected to a ground voltage by a connector.

17. The driving device of claim 13, wherein the conductive field further comprises a plurality of exposed fastening regions which are not covered with the insulating material and are electrically insulated to each other, each fastening region comprising a first fastening hole.

18. The driving device of claim 17, wherein each of the fastening regions is connected to a ground voltage by a connector.

19. The driving device of claim 17, wherein the shield comprises a plurality of projections which contact the fastening regions, each projection having a second fastening hole corresponding to the first fastening hole, and
    wherein the first and second fastening holes are connected to each other by a screw.

20. The driving device of claim 13, wherein the conductive member is a gasket coated with a conductive material.

21. The driving device of claim 13, wherein the exposed contact region is spaced less than about 7 cm away from a side of the timing controller or the memory.

22. The driving device of claim 13, wherein the shield further comprises a second projection not contacting the board and surrounding the timing controller and the memory.

23. The driving device of claim 13, wherein the exposed contact region is formed adjacent to the timing controller and the memory.

24. A liquid crystal display comprising:
    a driving device comprising: a board on which a timing controller for signal processing and a memory are mounted, the board comprising a conductive field connected to a ground voltage, wherein the conductive field comprises a non-contact region which is coated with an insulating material, an exposed contact region which is not covered with the insulating material, the exposed contact region formed adjacent to the timing controller or the memory, and a plurality of exposed fastening regions which are not covered with the insulating material and are electrically insulated to each other, each fastening region having a fastening hole; and a shield covering the board and comprising a first projection contacting the exposed contact region and a second projection contacting each fastening region; and
    a liquid crystal panel assembly for receiving an image signal from the driving device and displaying an image.

25. The liquid crystal display of claim 24, wherein the conductive member is a gasket coated with a conductive material.

26. The liquid crystal display of claim 24, wherein the exposed contact region is spaced less than about 7 cm away from a side of the timing controller or the memory.

27. The liquid crystal display of claim 24, wherein the exposed contact region is formed adjacent to the timing controller and the memory.

* * * * *